United States Patent
Asada

(10) Patent No.: US 7,659,670 B2
(45) Date of Patent: Feb. 9, 2010

(54) HEADLAMP CONTROL CIRCUIT

(75) Inventor: Kazuhiro Asada, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 362 days.

(21) Appl. No.: 11/894,926

(22) Filed: Aug. 22, 2007

(65) Prior Publication Data

US 2009/0001888 A1    Jan. 1, 2009

(30) Foreign Application Priority Data

Sep. 21, 2006    (JP) .............................. 2006-255932

(51) Int. Cl.
    *B60Q 1/02* (2006.01)
(52) U.S. Cl. ....................... 315/82; 307/10.8
(58) Field of Classification Search ............... 315/76, 315/77, 82; 307/10.1, 10.8
    See application file for complete search history.

(56) References Cited

U.S. PATENT DOCUMENTS

| | | | |
|---|---|---|---|
| 4,899,083 A * | 2/1990 | Kataoka et al. ............... | 315/77 |
| 5,517,064 A | 5/1996 | Murakami | |
| 5,661,368 A * | 8/1997 | Deol et al. ..................... | 315/82 |
| 6,281,631 B1 | 8/2001 | Schaffer et al. | |
| 6,452,337 B1 * | 9/2002 | Murata ......................... | 315/82 |
| 6,566,816 B2 | 5/2003 | Fushimi et al. | |
| 6,734,634 B2 * | 5/2004 | Kim ............................. | 315/82 |
| 6,958,897 B2 * | 10/2005 | Kubota et al. .................. | 361/62 |
| 7,075,237 B2 * | 7/2006 | Sato et al. ..................... | 315/82 |
| 2006/0097765 A1 | 5/2006 | Asada | |

FOREIGN PATENT DOCUMENTS

| | | |
|---|---|---|
| JP | 2000-233679 | 8/2000 |
| JP | 2002-144958 | 5/2002 |
| JP | 2004-291819 | 10/2004 |

OTHER PUBLICATIONS

Infineon Profet ITS428L2—Smart High-Side Power Switch for Industrial Applications Mar. 16, 2006—pp. 1-13.

* cited by examiner

*Primary Examiner*—Thuy Vinh Tran
(74) *Attorney, Agent, or Firm*—Gerald E. Hespos; Anthony J. Casella

(57) ABSTRACT

A headlamp control circuit reduces a possibility that all headlamps become lights-out in a two-lamp system headlight, even if a switching element fails under a high-beam condition while the single switching element is driven to light two right and left high-beam filaments. A headlamp control circuit includes switch sections (SW1) and (SW2) for lighting low-beam filaments (21) and (31), a switch section (SW3) for lighting high-beam filaments (22) and (32) together, a diode (D1) for detecting an output voltage on the switch section SW3, and a control section (120) for turning the switch section (SW3) to an on-condition in the case where a high-beam indication is accepted and for turning the switch sections (SW1) and (SW2) to an on-condition in the case where a low-beam indication is accepted and in the case where a high-beam indication is accepted and the diode (D1) detects no high-beam lighting voltage.

11 Claims, 7 Drawing Sheets

FIG. 3

| Input signal from ECU5 | Signal S1 | H | H | L | L |
| --- | --- | --- | --- | --- | --- |
| | Signal S2 | H | H | L | L |
| Lighting indication from ECU5 | | all lights-out | low-beam lighting | DRL mode | high-beam lighting |
| Two-lamp system operation | Low-beam filaments 21, 31 | lights-out | lighting | DRL lighting | lights-out |
| | High-beam filaments 22, 32 | lights-out | lights-out | lights-out | lighting |
| Four-lamp system operation | Low-beam headlamp | lights-out | lighting | lights-out | lighting |
| | High-beam headlamp | lights-out | lights-out | DRL lighting | lighting |

FIG. 4

| Failure mode (two-lamp system) | Operating Condition |
|---|---|
| Load in switch section SW1 is shorted. | As switch selection SW2 operates normally, low-beam filament 31 operates normally. |
| Load in switch section SW2 is shorted. | As switch selection SW1 operates normally, low-beam filament 21 operates normally. |
| Switch section SW1 is shorted and opened. | As switch selection SW2 operates normally, low-beam filament 31 operates normally. |
| Switch section SW2 is shorted and opened. | As switch selection SW1 operates normally, low-beam filament 21 operates normally. |
| Load in switch section SW3 is shorted. (High-beam filament 22 is shorted.) | Switch SW3 is not off. As chopped signal is cut by CR filter 130 under action of self protecting function, switch sections SW1, SW2 are not forced off and low-beam filaments 21, 31 are lighted. |
| Load in switch section SW3 is shorted. (High-beam filament 32 is shorted.) | |
| Switch section SW3 is shorted. | As high-beam filaments 22, 32 keep to light, condition is within safety side. |
| Switch section SW3 is opened. | As output voltage on switch SW3 becomes low level, switch sections SW1, SW2 are not forced off and low-beam filaments 21, 31 are lighted. | ent
HEADLAMP CONTROL CIRCUIT

BACKGROUND OF THE INVENTION

1. Field of the Invention

This invention relates to a headlamp control circuit that controls a drive of lighting headlamps on a vehicle.

2. Description of the Related Art

Known headlamp systems for a vehicle typically have four-lamps or two-lamps. The four-lamp system has a high-beam headlamp and a low-beam headlamp on each of the right and left sides of a vehicle. The two-lamp system has a high-beam filament and a low-beam filament on each of the right and left sides of the vehicle.

Only the right and left low-beam headlamps of the four-lamp system are lit to make a low-beam condition. However, all four lamps of the four-lamp system are lit to make a high-beam condition.

The right and left low-beam filaments of the two-lamp system are lit to make a low-beam condition, and all four filaments of the two-lamp system also are lit to make a high-beam condition.

A headlamp control circuit that controls a drive of lighting the headlamps includes a switching element to drive the lighting of each headlamp in the four-lamp system and each filament in the two-lamp system. Either system typically includes four switching elements.

JP 2000-233679A discloses a four-lamp system with a single switching element to drive the lighting of right and left high-beam headlamps to downsize a headlamp control circuit or to lower a calorific value. The single switching element disclosed in JP 2000-233679 A for driving the lighting of right and left high-beam headlamps in the four-lamp system results in the right and left low-beam headlamps being lit even if the switching element fails under a high-beam condition. Thus, all headlamps are not brought into a lights-out condition, and security is maintained.

However, if a single switching element drives the lighting of right and left high-beam headlamps in the two-lamp system, there has been a trouble that all headlamps are brought into a lights-out condition if the switching element fails under a high-beam condition.

In view of the above, an object of the invention is to provide a headlamp control circuit for a two-lamp headlight system with a single switching element to drive the lighting of right and left high-beam filaments with a reduced possibility of a lights-out condition if the switching element fails under a high-beam condition.

SUMMARY OF THE INVENTION

The invention relates to a headlamp control circuit with first and second connecting terminals for outputting low-beam lighting voltages that light first and second luminescent parts to be used respectively as low-beam headlamps. The headlamp control circuit also includes third and fourth connecting terminals for outputting high-beam lighting voltages that light third and fourth luminescent parts to be used respectively as high-beam headlamps. First and second switch sections are provided for turning on and off supplies of the low-beam lighting voltages to the first and second connecting terminals. A third switch section is provided for turning on and off together supplies of the high-beam lighting voltages to the third and fourth connecting terminals. An output voltage detecting section is provided for detecting an output voltage on the third switch section and an indication reception section is provided for accepting a low-beam indication that lights the low-beam headlamps. The control circuit further includes a high-beam indication that lights the high-beam headlamps. A control section is provided for turning the third switch section to an on-condition when the indication reception section accepts the high-beam indication. The control section also turn the first and second switch sections to an on-condition if the indication reception section accepts the low-beam indication or if the indication reception section accepts the high-beam indication and the output voltage detecting section detects no high-beam lighting voltage.

The control circuit causes the third switch section to be turned on when the indication reception section accepts the high-beam lighting indication and the third and fourth luminescent parts for high-beam connected to the third and fourth connecting terminals are lit. Also, the first and second switch sections are turned on when the indication reception section accepts the low-beam indication, and the first and second luminescent parts for low-beam connected to the first and second connecting terminals are lit. A case where the indication reception section accepts the high-beam lighting indication and the output voltage detecting section does not detect the high-beam lighting voltage will be interpreted as a case where the third and fourth luminescent parts for high-beam are not lit due to a failure in the third switch section. In this situation, the control circuit lights the first and second luminescent parts for low-beam. The headlamp control circuit for a two-lamp system reduces a possibility that all headlamps are brought into lights-out, even if the third switch section fails under the high-beam condition while the single third switch section drives the third and fourth luminescent parts for high-beam.

The control section preferably has a low-beam lighting signal output section for outputting a signal that turns the first and second switch sections on if the indication reception section accepts either the low-beam lighting indication or the high-beam lighting indication. The control section also preferably has a high-beam lighting signal output section for outputting a signal that turns the third switch section to an on-condition if the indication reception section accepts the high-beam lighting indication. A forced-off section preferably is provided for compulsorily turning the first and second switch sections off if the output voltage detecting section detects the high-beam lighting voltage.

With the above construction, the low-beam lighting signal output section outputs a signal for turning the first and second switch sections on if the indication reception section accepts either the low-beam lighting indication or the high-beam lighting indication. Also, the high-beam lighting signal output section outputs a signal for turning the third switch section on, when the indication reception section accepts the high-beam lighting indication. The forced-off section compulsorily turns the first and second switch sections off when the third switch section turns on and the output voltage detecting section detects the high-beam lighting voltage, regardless of any signal supplied from the low-beam lighting signal output section. Accordingly, when the indication reception section accepts the high-beam lighting indication, only the third and fourth luminescent parts for high-beam are driven to light the high-beam lighting in the two-lamp system headlight. In this case, the output voltage detecting section does not detect the high-beam lighting voltage when the third switch section fails under a high-beam condition. Thus, the first and second switch sections are not compulsorily turned off. Consequently, the first and second switch sections are turned on in accordance with the signal supplied from the low-beam lighting signal output section and the first and second luminescent parts for low-beam are lit. Accordingly, the headlamp control circuit for controlling a two-lamp headlight system reduces a possibility that all headlamps are brought into lights-out even if the third switch section fails under the high-beam condition while the single third switch section drives the third and fourth luminescent parts for high-beam lighting.

The high-beam lighting voltage is not detected by the output voltage detecting section when the output voltage detecting section is removed from the headlamp control section. Thus, the first and second switch sections are not turned off compulsorily during high-beam lighting. As a result, the first and second switch sections are turned on in accordance with a signal supplied from the low-beam lighting signal output section. The first, second, third, and fourth luminescent parts are lit during high-beam lighting. Thus, it is possible to carry out a lighting control of the four-lamp system headlight by removing the output voltage detecting section from the headlamp control circuit.

The third switch section may be a semiconductor switch. The semiconductor switch is less reliable and more likely to fail than a mechanical relay. However, the semiconductor switch facilitates downsizing of the third switch section, and it is possible to reduce a possibility that all headlamps are brought into lights-out by using the above-described headlamp control section in the lighting control of the two-lamp system headlight, even if the third switch section fails under a high-beam condition.

The third switch section preferably includes a self protecting section for chopping an output voltage when an abnormal condition is detected. Additionally, a low-pass filter is provided in a signal transmitting path from the third switch section through the output voltage detecting section and the control section to the first and second switch sections. Thus, the voltage chopped by the third switch section is shut off by the low-pass filter and the chopped voltage restricts on-off actions of the first and second switch sections.

In the above-described headlamp control, circuit, the third switch section is turned on when the indication reception section accepts the high-beam lighting indication and the third and fourth luminescent parts for high-beam connected to the third and fourth connecting terminals are lit. Also, the first and second switch sections are turned on and the first and second luminescent parts for low-beam connected to the first and second connecting terminals are lit when the indication reception section accepts the low-beam indication. The case where the indication reception section accepts the high-beam lighting indication and the output voltage detecting section does not detect the high-beam lighting voltage will be taken for the case where the third and fourth luminescent parts for high-beam are not lit due to a failure in the third switch section. Thus, the control circuit lights the first and second luminescent parts for low-beam. It is possible to reduce a possibility that all headlamps are brought into lights-out when such headlamp control circuit is used in a lighting control for a two-lamp system headlight, even if the third switch section fails under the high-beam condition while the single third switch section drives to light the third and fourth luminescent parts for high-beam.

BRIEF DESCRIPTION OF THE DRAWINGS

FIG. 3 is a table illustrating an operation of the headlamp control circuit shown in FIGS. 1 and 2.

FIG. 4 is a table illustrating an operating condition of the headlamp control circuit in the case where failures occur.

DETAILED DESCRIPTION OF THE PREFERRED EMBODIMENTS

Figure 1:
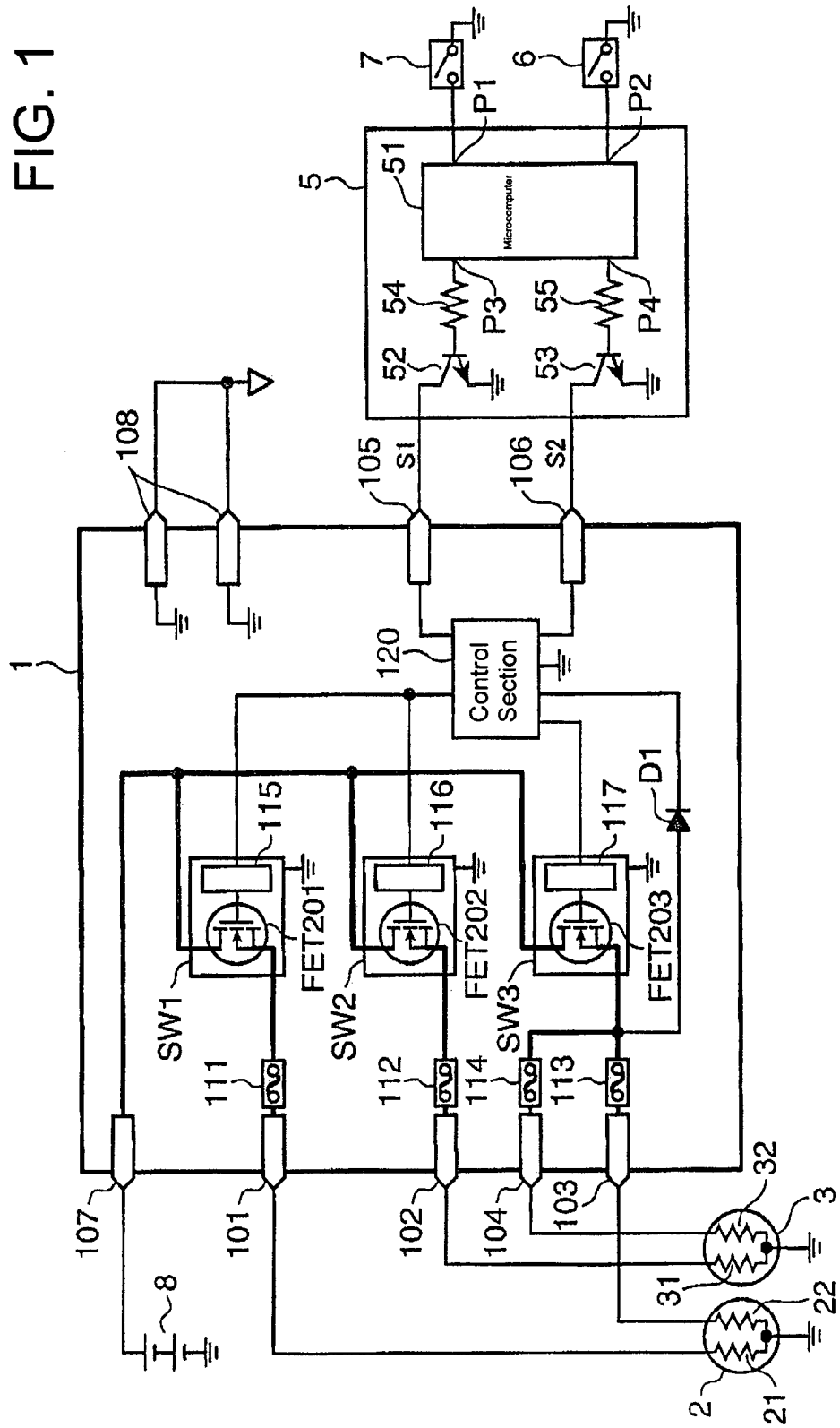
FIG. 1 is a circuit diagram illustrating an example of a construction of a headlamp control system that utilizes a headlamp control circuit in accordance with a first embodiment of the invention.

The headlamp control system shown in FIG. 1 includes a headlamp control circuit 1, a left headlamp 2, a right headlamp 3, an ECU (Electric Control Unit) 5, operation switches 6 and 7, and a battery 8.

The left headlamp 2 includes a low-beam filament (first luminescent part) 21 and a high-beam filament (third luminescent part) 22. The right headlamp 3 includes a low-beam filament (second luminescent part) 31 and a high-beam filament (fourth luminescent part) 32. The ECU 5 includes a microcomputer 51, transistors 52 and 53, and resisters 54 and 55.

Signal input terminals P1 and P2 of the microcomputer 51 are connected to the operation switches 6 and 7, respectively. A signal output terminal P3 of the microcomputer 51 is connected through the resister 54 to a base of the transistor 52 and an emitter of the transistor 52 is connected to the ground. A signal output terminal P4 of the microcomputer 51 is connected through the resister 55 to a base of the transistor 53 and an emitter of the transistor 53 is connected to the ground. The microcomputer 51 gives an on-off control to the transistors 52 and 53 in response to an on-off action of the operation switches 6 and 7, so that collector voltages of the transistors 52 and 53 are applied to the headlamp control circuit 1 as signals S1 and S2.

The headlamp control circuit 1 includes first, second, third, and fourth lamp connecting terminals 101, 102, 103, and 104, lightning indication reception terminals 105 and 106, a power source terminal 107, ground terminals 108, fuses 111, 112, 113, and 114, first, second, and third switch sections SW1, SW2, and SW3, an output voltage detector diode D1, and a control section 120.

The lamp connecting terminal 101 is connected through the low-beam filament 21 to the ground; the lamp connecting terminal 102 is connected through the low-beam filament 31 to the ground; the lamp connecting terminal 103 is connected through the high-beam filament 22 to the ground; the lamp connecting terminal 104 is connected through the high-beam filament 32 to the ground. The power source terminal 107 is connected to an anode of the battery 8. The ground terminals 108 are connected to a circuit ground.

The lighting indication reception terminals 105 and 106 are connected through the ECU 5 to the operation switches 6 and 7. In more detail, the lighting indication reception terminal 105 is connected to the collector of the transistor 52 and receives the signal S1 outputted from the ECU 5. The lighting indication reception terminal 106 is connected to the collector of the transistor 53 and receives the signal S2 outputted from the ECU 5.

The switch sections SW1, SW2, and SW3 are semiconductor switches having self protecting functions that limit output currents when abnormal conditions such as overcurrents, overheats, or the like due to, for example, output short circuits or the like are detected. For instance, a semiconductor relay switch in PROFET series produced by INFINION Company can be utilized. The switch section SW1 includes an FET (Field Effect Transistor) 201 and a self protecting section 115. The switch section SW2 includes an FET 202 and a self protecting section 116. The switch section SW3 includes an FET 203 and a self protecting section 117. The self protecting sections 115, 116, and 117 are circuits that limit output currents by chopping an output voltage at a given frequency when an abnormal condition is detected.

A power source voltage is supplied from the battery 8 through the power source terminal 7 to drains of the FET 201, the FET 202, and the FET 203. Sources of the FETs 201 and 202 are connected through the fuses 111 and 112 to the lamp connecting terminals 101 and 102. A source of the FET 203 is connected through the fuse 113 to the lamp connecting terminal 103 and through the fuse 114 to the lamp connecting terminal 104. Furthermore, the self protecting sections 115, 116, and 117 give on-off actions to the FET 201, FET 202, and FET 203 in response to a control signal from the control section 120, or they give the on-off actions to the FETs 201, 202, and 203 at a given frequency to effect a protecting operation.

The diode D1 serves as an output voltage detecting section that applies an output voltage from the FET 203 to the control section 120.

The control section 120 includes, for example, a microcomputer, a logical circuit, an oscillating circuit, or the like. When the signal S1 accepted in the lighting indication reception terminal 105 is a high level and the signal S2 accepted in the lighting indication reception terminal 106 is a high level, the control section 120 turns all of the switch sections SW1, SW2, and SW3 to an off-condition to bring the left headlamp 2 and the right headlamp 3 into lights-out. When the signal S1 is a low level and the signal S2 is a high level, the control section 120 turns the switch sections SW1 and SW2 to an on-condition in response to the low-beam lighting indication to light the low-beam filaments 21 and 31. When the signal S1 is a low level and the signal S2 is a low level, the control section 120 turns the switch section SW3 to an on-condition in response to the high-beam lighting indication to light the high-beam filaments 22 and 32. Furthermore, after the control section 120 turns the SW3 to an on-condition in response to the high-beam lighting indication, the control section 120 turns the switch sections SW1 and SW2 to an on-condition to light the low-beam filaments 21 and 31 since it is judged that the switch section SW3 or its peripheral circuit is subject to a failure when an output voltage on the switch section SW3 obtained through the diode D1. Thus, it is possible to avoid that all of the headlamps are brought into lights-out.

When the signal S1 is a high level and the signal S2 is a low level, the control section 120 lights the left headlamp 2 and the right headlamp 3 in a dimmer lighting manner by a PWM (Pulse Width Modulation) control in response to an indication in a DRL (Day-time Running Light) mode that lights the headlamp in a reduced amount of light.

Figure 2:
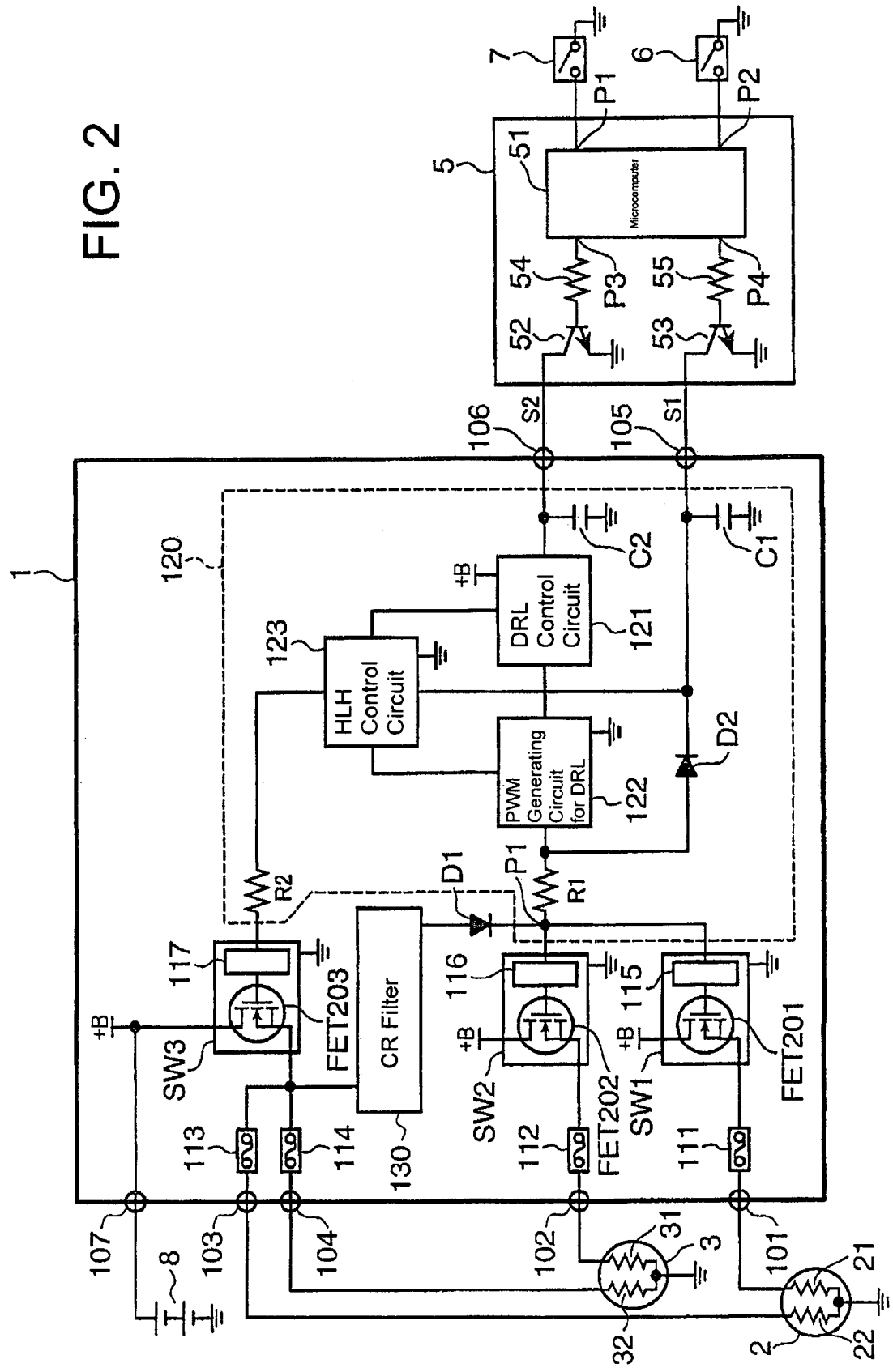
FIG. 2 is a detailed circuit diagram of the headlamp control circuit shown in FIG. 1.

FIG. 2 is a detailed circuit diagram illustrating an example of the headlamp control circuit 1 shown in FIG. 1, and has a source of the FET 203 connected through a CR filter (low-pass filter) 130 to an anode of the diode D1. Also, the control circuit 120 shown in FIG. 2 includes a DRL control circuit 121, a PWM generating circuit 122 for DRL, an HLH control circuit (high-beam lighting signal output section) 123, resistors R1 and R2, a diode (low-beam lighting signal output section) D2, and capacitors C1 and C2.

The lighting indication reception terminal 106 is connected through the DRL control circuit 121 and the PWM generating circuit 122 for DRL to the switch sections SW1 and SW2 and a connecting point P1 of a cathode of the diode D1. A connecting point between the PWM generating circuit 122 for DRL and the resistor R1 is connected to an anode of the diode D2 while the cathode of the diode D2 is connected to the lighting indication reception terminal 105. The lighting indication reception terminal 105 is connected through the capacitor C1 to the ground. The lighting indication reception terminal 106 is connected through the capacitor C2 to the ground. The capacitors C1 and C2 are noise filters.

The DRL control circuit 121 outputs a control signal for indicating a DRL mode to the PWM generating circuit 122 for DRL and the HLH control circuit 123 when the signal S2 is a low level. When the PWM generating circuit 122 for DRL receives the control signal for indicating the DRL mode from the DRL control circuit 121, the circuit 122 generates a PWM signal of, for example a predetermined duty ratio (for instance, 80% in duty ratio) and supplies the PWM signal through the resistor R1 to the switch sections SW1 and SW2 and the HLH control circuit 123.

When the signal S1 received on the lighting indication reception terminal 105 is a low level and the HLH control circuit 123 receives a control signal for indicating the DRL mode (the signal S2 is a low level) from the DRL control circuit 121, the HLH control circuit 123 supplies a control signal through the resistor R2 to the switch section SW3 to light the high-beam filaments 22 and 23.

When the signal S1 received on the lighting indication reception terminal 105 is a high level and the HLH control circuit 123 receives a control signal for indicating the DRL mode (the signal S2 is a low level) from the DRL control circuit 121, the HLH control circuit 123 supplies the PWM signal outputted from the PWM generating circuit 122 for DRL through the resistor R2 to the switch section SW3 in order to light the high-beam filaments 22 and 23 in the dimmer lighting manner.

Next, an operation of the headlamp control circuit 1 constructed above during a normal condition will be described. FIG. 3 is a table illustrating an operation of the headlamp control circuit. In FIG. 3, when the signals S1 and S2 are the high level, they are expressed by a sign "H" and when the signals S1 and S2 are the low level, they are expressed by a sign "L". First, an operation of a two-lamp system is described. An operation of a four-lamp system will be described after. A case that the signal S1 is "H" and the signal S2 is "H" means that all headlamps are lights-out. In this case, the switch sections SW1, SW2, and SW3 are turned to off-conditions by the control section 120, the low-beam filaments 21 and 31 and the high-beam filaments 22 and 32 are brought into lights-out and the left headlamp 2 and the right headlamp 3 are all brought into lights-out.

A case that the signal S1 is "L" and the signal S2 is "H" shows a low-beam lighting indication. In this case, since the signal S1 becomes the low level, that is, a voltage on the lighting indication reception terminal 105 is the low level, control input signals on the switch sections SW1 and SW2 are brought into the low levels through the diode D2 and the resistor R1, the FET 201 and FET 202 are turned to the on-condition by the self protecting sections 115 and 116 to light the low-beam filaments 21 and 31, and the left headlamp 2 and the right headlamp 3 are brought into a low-beam lighting condition.

A case that the signal S1 is "H" and the signal S2 is "L" shows a lighting indication in the DRL mode. In this case, since the signal S2 becomes the low level, a control signal for indicating the DRL mode is supplied to the PWM generating circuit 122 for DRL by the DRL control circuit 121. A PWM signal having, for example, a duty ratio of 80% is supplied through the resistor R1 to the switch sections SW1 and SW2 by the PWM generating circuit 122 for DRL, the FET 201 and the FET 202 are turned to the on-condition and the off-condition by the self protecting sections 115 and 116 at the duty ratio of 80% in response to the PWM signal. Consequently, the low-beam filaments 21 and 31 are brought into the dimmer lighting manner.

On the other hand, the HLH control circuit 123 turns the switch section SW3 to the off-condition on account of the signal S1 being at the high level and brings the high-beam filaments 22 and 32 into lights-out. Thus, the low-beam filaments 21 and 31 are brought into the dimmer lighting manner and the left headlamp 2 and the right headlamp 3 are brought into the lighting condition in the DRL mode under reduction of an amount of light.

A case that the signal S1 is "L" and the signal S2 is "L" shows a high-beam lighting indication. In this case, when the signal S1 becomes the low level, a low level signal is supplied to the control input terminals of the switch sections SW1 and SW2 by the diode D2 and the resistor R1 to turn the switch sections SW1 and SW2 on.

Since the signal S2 becomes the low level, a control signal for indicating the DRL mode is supplied to the HLH control circuit 123 by the DRL control circuit 121. In the case where the signal S1 is the low level and the control signal for indicating the DRL mode is supplied from the DRL control circuit 121, the high-beam lighting indication is accepted in the HLH control circuit 123 to turn the switch section SW3 on. Then, the high-beam filaments 22 and 23 are lit.

Furthermore, when the switch section SW3 is turned to the on-condition to increase an output voltage, since the signal S1 becomes the low level, that is, a voltage on the lighting indication reception terminal 105 becomes the low level, a current flows through the CR filter 130, the diode D1, the resistor R1, and the diode D2 into the lighting indication reception terminal 105 and a voltage on the resistor R1 decreases. In result, a voltage on the connecting point P1 rises, the control input signals to the switch sections SW1 and SW2 are forced to be the high level, and the switch sections SW1 and SW2 are turned to the off-condition. Consequently, the low-beam filaments 21 and 31 are turned to the off-condition.

In this case, the diode D1 will corresponds to an example of an output voltage detecting section and the diode D1 and the resistor R1 correspond to an example of a forced-off section. Even if the lighting indication reception terminals 105 and 106 accept either the low-beam lighting indication or the high-beam lighting indication, since the signal S1 becomes the low level and the low level signal is supplied to the control input terminals of the switch sections SW1 and SW2 by the diode D2 and the resistor R1 in order to turn the switch sections SW1 and SW2 to the on-condition, the diode D2 and the resistor R1 correspond to an example of a low-beam lighting signal output section.

Next, an operation of the headlamp control circuit 1 in the case where failures occur will be described below. FIG. 4 is a table illustrating an operating condition of the headlamp control circuit 1 in the case where failures occur. First, in the case where a load of the switch section SW1, for example, the low-beam filament 21 is shorted under low-beam lighting, the low-beam filament 31 lights normally and all headlamps are not brought into lights-out, since the switch section SW2 operates normally. Similarly, in the case where a load of the switch section SW2, for example, the low-beam filament 31 is shorted under low-beam lighting, the low-beam filament 21 lights normally and all headlamps are not brought into lights-out, since the switch section SW1 operates normally.

In the case where the switch section SW1 is subject to a short failure or an open failure under the low-beam lighting, the low-beam filament 31 lights normally and all headlamps are not brought into lights-out, since the switch section SW2 operates normally. Similarly, in the case where the switch section SW2 is subject to a short failure or an open failure under low-beam lighting, the low-beam filament 21 lights normally and all headlamps are not brought into lights-out, since the switch section SW1 operates normally.

In the case where a load of the switch section SW3, for example, the high-beam filament 22 or 32 is shorted under high-beam lighting, the self protecting section 117 detects an overcurrent and brings the FET 203 into the on- and off-conditions to chop an output voltage.

Figure 5A:
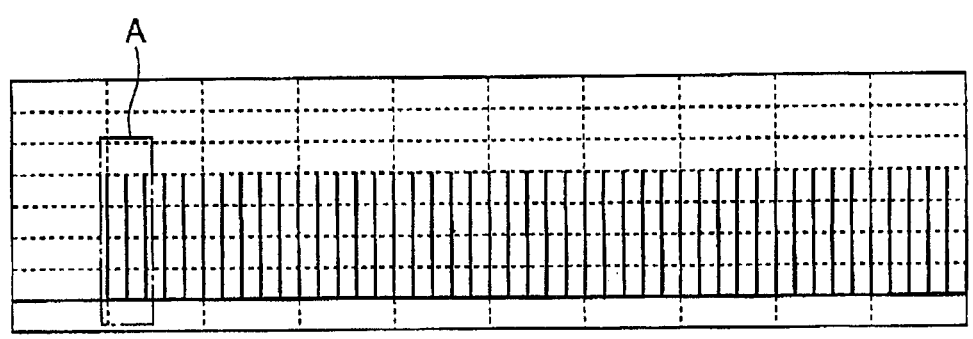
FIGS. 5a and 5b are signal waveform diagrams illustrating an example of an output voltage waveform chopped by a self protecting operation in a switch section shown in FIGS. 1 and 2.
Figure 5B:
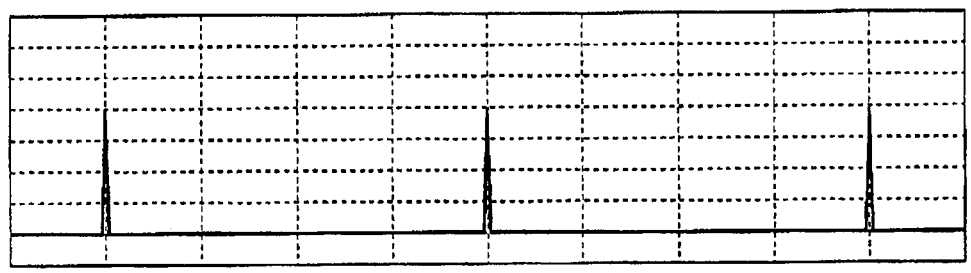

FIGS. 5a and 5b are an example of a signal waveform diagram illustrating an example of an output voltage waveform of the FET 203 chopped by a self protecting operation in the switch section SW3. In FIG. 5, an abscissa axis denotes a period in time and an ordinate axis denotes a voltage. In FIG. 5a, one scale in the abscissa axis is expressed in 100 milliseconds. FIG. 5b is an enlarged diagram of the waveform in an area A in FIG. 5a. In FIG. 5b, one scale in the abscissa axis is expressed in 5 milliseconds. As shown in FIG. 5b, an output voltage chopped by the self protecting operation of the switch section SW3 is formed into a very short pulse having, for example, a time cycle of 20 milliseconds and a pulse width of lower than 1 millisecond.

Since the output voltage waveform shown in FIG. 5b is smoothed by the CR filter 130 to be formed into a low level signal, a voltage on the connecting point P1 is not forced into a high level through the diode D1. Accordingly, the control input signals on the switch sections SW1 and SW2 are brought into low levels to turn the switch sections SW1 and SW2 to the on-condition and to light the low-beam filaments 21 and 31.

Thus, in the case where a load of the switch SW3, for example, the high-beam filament 22 or 32 is shorted under high-beam lighting, the low-beam filaments 21 and 31 are lighted and all headlamps are not brought into lights-out.

Next, in the case where the switch section SW3 is subject to a short failure, since the high-beam filaments 22 and 32 continue to lighting, the headlamp control circuit becomes a safety side operation and keeps a failsafe function. Also, in the case where the switch section SW3 is subject to an open failure, since an output voltage on the switch section SW3 becomes the low level, a voltage on the connecting point P1 is not forced to be a high level through the diode D1. Accordingly, since control input signals to the switch sections SW1 and SW2 are brought into the low levels to turn the switch sections SW1 and SW2 to the on-condition and the low-beam filaments 21 and 31 are lighted, all headlamps are not brought into lights-out.

Although mechanical relays may be used for the switch sections SW1, SW2, and SW3, it will be easy to downsize the headlamp control circuit 1 by utilizing semiconductor relay switches. In this case, since the semiconductor relay switches have reliability lower than the mechanical relays in general, if a single switch section SW3 effects a drive of lighting two right and left high-beam filaments, there will be much possibility that the two right and left high-beam filaments cannot be lighted when the single switch section is subject to a failure. However, since the headlamp control circuit 1 shown in FIGS. 1 and 2 can light the low-beam filaments 21 and 31 even if the switch section SW3 is subject to a failure under high-beam lighting, all headlamps are not brought into lights-out and a failsafe function can be held.

In the case where the mechanical relay is used as the switch section SW3, the fuses 113 and 114 will be blown out to maintain the failsafe function, when wires connected to the lamp connecting terminals 103 and 104 happen to contact with a vehicle body to cause a short failure in a load. However, if the semiconductor relay switch having a self protecting function for limiting an output current by chopping an output voltage is used as the switch section SW3, there will be a possibility of failure mode in which the fuses 113 and 114 are not blown out on account of limiting the output current when a short-circuit occurs in a load. However, since the headlamp control circuit 1 shown in FIGS. 1 and 2 can light the low-beam filaments 21 and 31 even if the switch section SW3 acts such self protecting operation under high-beam lighting, all headlamps are not brought into lights-out and a failsafe function can be held.

Figure 6:
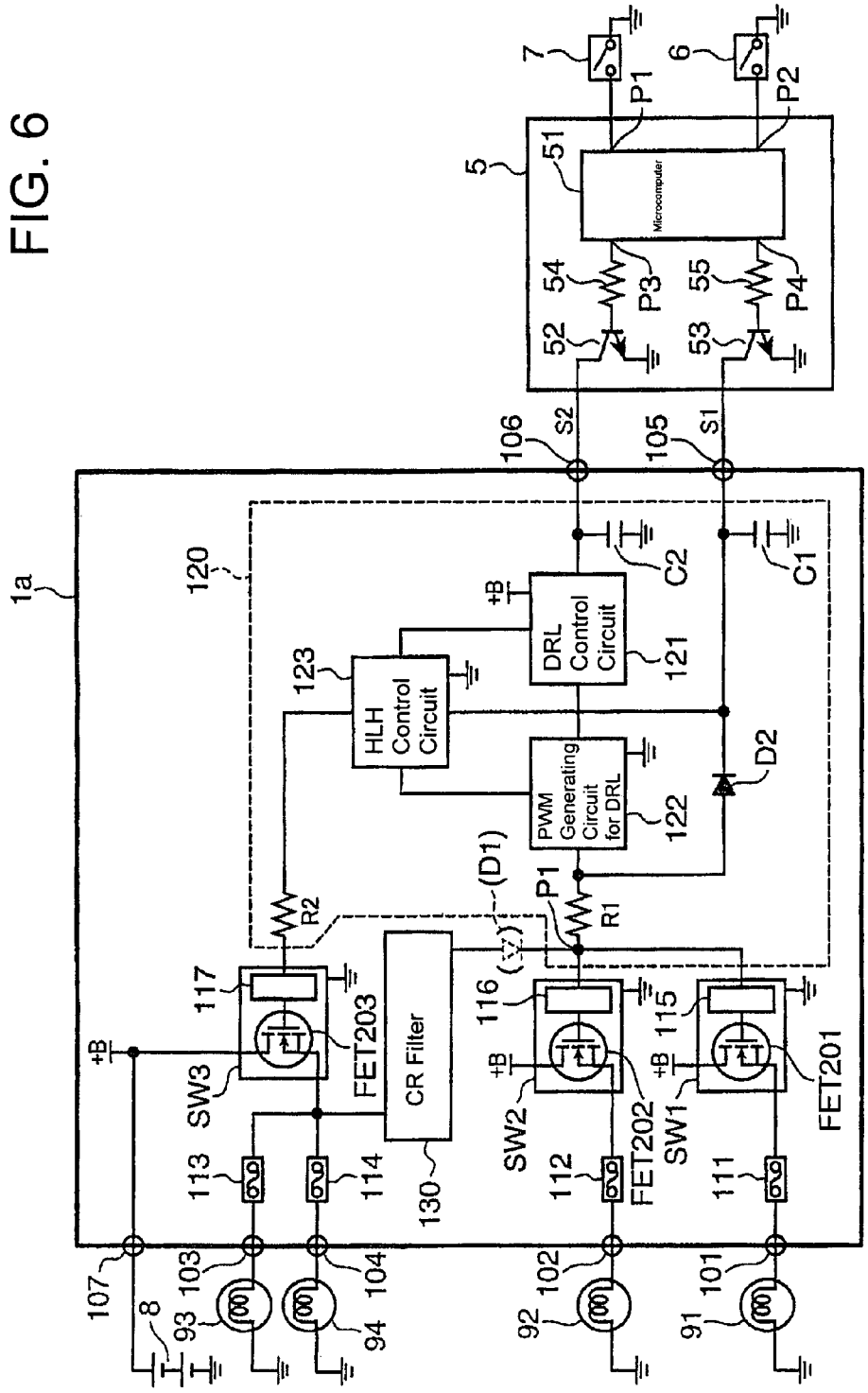
FIG. 6 is a circuit diagram illustrating an example of a construction of a headlamp control system in which the headlamp control circuit shown in FIG. 2 is utilized in a lighting control for a four-lamp headlight system.

FIG. 6 is a circuit diagram illustrating an example of a construction of a headlamp control system in which the headlamp control circuit 1 shown in FIG. 2 is utilized in a lighting control for a four-lamp system headlight. As shown in FIG. 6, the diode D1 is removed from the headlamp control circuit 1 to produce a headlamp control circuit 1a. The headlamp control circuit 1a can effect the lighting control for the four-lamp system headlight by connecting a left low-beam headlamp (first luminescent part) 91 instead of the low-beam filament 21 to a lamp connecting terminal 101, by connecting a right low-beam headlamp (second luminescent part) 92 instead of the low-beam filament 31 to a lamp connecting terminal 102, by connecting a left high-beam headlamp (third luminescent part) 93 instead of the high-beam filament 22 to a lamp connecting terminal 103, and by connecting a right high-beam headlamp (fourth luminescent part) 94 instead of the high-beam filament 32 to a lamp connecting terminal 104. The CR filter 130 along with the diode D1 may be removed.

The operation of the headlamp control circuit 1a is described with reference to FIG. 3. First, a case that the signal S1 is "H" and the signal S2 is "H" means that all of the headlamps are brought into lights-out similar to the case in the two-lamp system headlight. In this case, the switch sections SW1, SW2, and SW3 are turned to the off-condition, the left low-beam headlamp 91, the right low-beam headlamp 92, the left high-beam headlamp 93, and the right high-beam headlamp 94 are brought into lights-out, and all headlamps are brought into lights-out.

A case that the signal S1 is "L" and the signal S2 is "H" shows the low-beam lighting indication similarly to the case in the two-lamp system headlight. In this case, the signal S1 becomes a low level, that is, a voltage on the lighting indication reception terminal 105 becomes the low level. In result, control input signals to the sections SW1 and SW2 become the low levels through the diode D2 and the resistor R1, the FET 201 and the FET 202 are brought into the off-condition, and the left low-beam headlamp 91 and the right low-beam headlamp 92 are lighted to be brought into the low-beam lighting condition.

A case that the signal S1 is "H" and the signal S2 is "L" shows a lighting indication in the DRL mode similarly to the two-lamp system headlight. The switch section SW3 is turned to the on- and off-conditions at a duty ratio of 80% by the HLH control circuit 123 in accordance with the PWM signal produced in the PWM generating circuit 122 for DRL in response to the control signal from the DRL control circuit 121. Consequently, the left and right high-beam headlamps 93 and 94 are brought into the dimmer lighting manner. In this case, the DRL control circuit 121 may change the luminescent part for DRL-lighting in the DRL mode from the low-beam side in the two-lamp system headlight to the high-beam side in the four-lamp system headlight by setting the four-lamp system headlight by setting means such as a jumper pin or the like (not shown).

A case that the signal S1 is "L" and the signal S2 is "L" shows a high-beam lighting indication similar to the case of the two-lamp system headlight. In this case, since the signal S1 received in the lighting indication reception terminal 105 becomes the low level, the control inputs to the switch sections SW1 and SW2 become the low level through the diode D2 and the resistor R1, the switch sections SW1 and SW2 are turned on to light the left low-beam headlamp 91 and the right low-beam headlamp 92.

Furthermore, since the signal S2 becomes the low level, a control signal for indicating the DRL mode is supplied to the HLH control circuit 123 by the DRL control circuit 121. In the case where the signal S1 is the low level and a control signal for indicating DRL mode (the signal S2 is the low level) is outputted from the DRL control circuit 121, the high-beam lighting indication is accepted in the HLH control circuit 123 to turn the switch section SW3 to the on-condition. Then, the left high-beam headlamp 93 and the right high-beam headlamp 94 are lighted. In this case, even if an output voltage is increased by the switch section SW3 turned to the on-condition, since the diode D1 is not provided, control input signals to the switch sections SW1 and SW2 are forced to the high levels, the switch sections SW1 and SW2 are not turned to the off-condition, and the left low-beam headlamp 91 and the right low-beam headlamp 92 keep lighting.

Thus, the left low-beam headlamp 91, the right low-beam headlamp 92, the left high-beam headlamp 93 and the right high-beam headlamp 94 are all lighted to be brought into the high-beam lighting conditions.

In this case, since merely by removing the diode D1 from the headlamp control circuit 1 to be used in a lighting control of the two-lamp system headlight, the headlamp control circuit 1a can be used in the lighting control of the four-lamp system headlight, the headlamp control circuit 1 and the headlamp control circuit 1a can share a printed wiring board, whereby it is possible to reduce the number of man hour in design and a cost in design.

Figure 7:
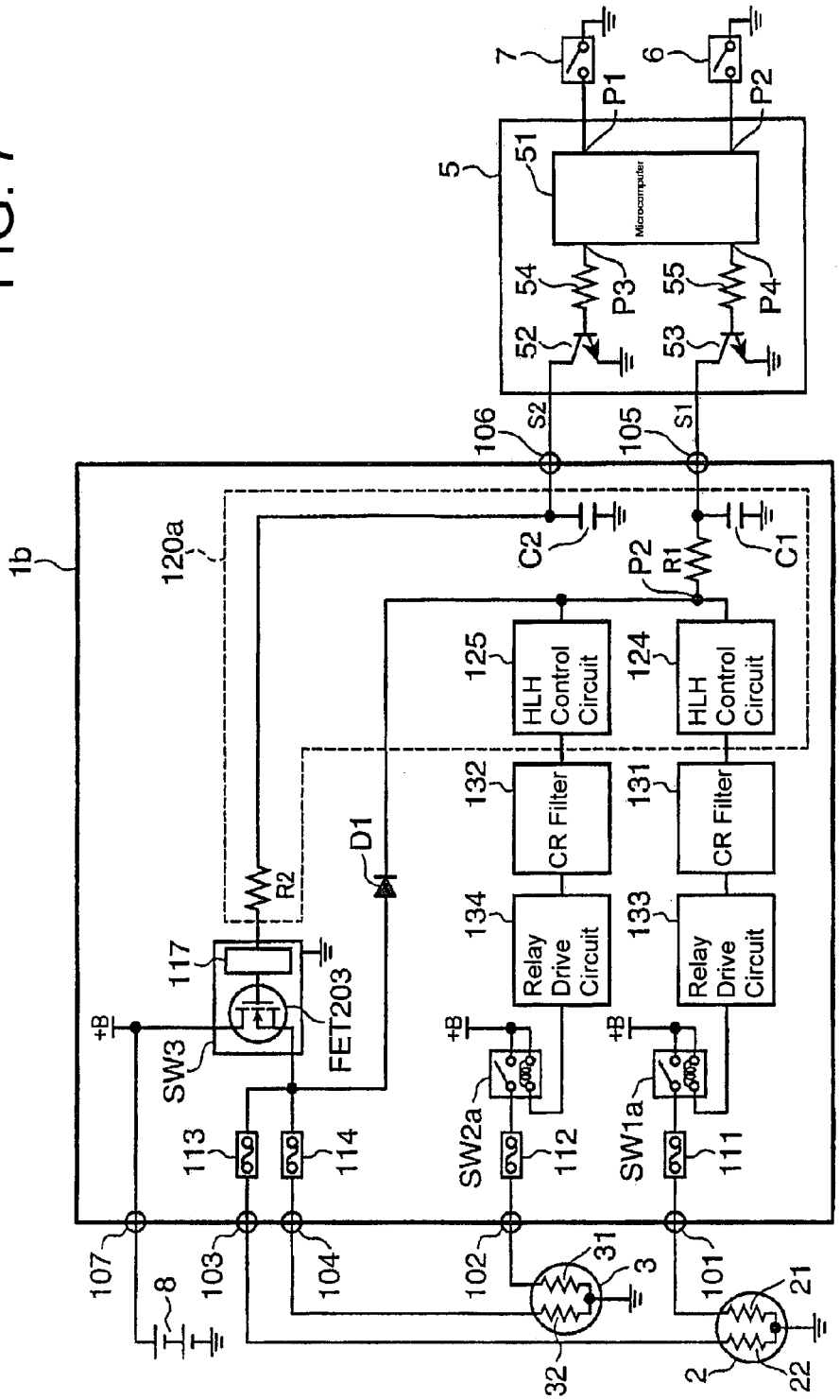
FIG. 7 is a circuit diagram illustrating an example of a construction of a headlamp control system in accordance with a second embodiment of the invention.

FIG. 7 is a circuit diagram illustrating an example of a construction of a second embodiment of a headlamp control circuit 1b in accordance with the present invention. The headlamp control circuit 1b shown in FIG. 7 differs from the headlamp control circuit 1 shown in FIG. 1 with respect to the following points.

A control section 120a in the headlamp control circuit 1b does not include the DRL control circuit 121, the PWM generating circuit 122 for DRL, and the HLH control circuit 123 and alternatively includes HLH control circuits 124 and 125. Mechanical relay switches are used as switch sections SW1a and SW2a instead of the switch sections SW1 and SW2 and relay drive circuits 133 and 134 for driving the switch sections SW1a and SW2a. In a signal transmitting path extending from the switch section SW3 through the diode D1 and the control section 120a to the switch sections SW1a and SW2a, positions, on which the CR filters (low-pass filters) 131 and 132 are arranged, are different.

The lighting indication reception terminal 106 is connected through the resistor R2 to a control input terminal of the switch section SW3. The lighting indication reception terminal 105 is connected through the resistor R1, the HLH control circuit 124, the CR filter 131, and the relay drive circuit 133 to a control input terminal of the switch section SW1a. Also, the lighting indication reception terminal 105 is connected through the resistor R1, the HLH control circuit 125, the CR filter 132, and the relay drive circuit 134 to a control input terminal of the switch section SW2a. The HLH control circuits 124 and 125 are, for example, buffer circuits. The relay drive circuits 133 and 134 include driver circuits for driving currents and surge-absorbing circuits.

Next, an operation of the headlamp control circuit 1b constructed above under a normal condition will be described below. The headlamp control circuit 1b does not carry out the DRL mode shown in FIG. 3.

First, a case of the two-lamp system headlight will be described. When the signal S2, namely a voltage on the lighting indication reception terminal 106 becomes a low level, a control input signal to the switch section SW3 becomes a low level through the resistor R2, and the switch section SW3 is turned to the on-condition to light the high-beam filaments 22 and 32. When the switch section SW3 is turned to the on-condition and an output voltage from the switch section SW3 becomes the high level, a voltage on the connecting point P2 between the resistor R1 and the HLH control circuits 124, 125 is force to be the high level by the diode D1. Then, the switch section SW1a is turned to the off-condition by the HLH control circuit 124, the CR filter 131, and the relay drive circuit 133 and the switch section SW2a is turned to the off-condition by the HLH control circuit 125, the CR filter 132, and the relay drive circuit 134. As a result, the low-beam filaments 21 and 31 are forced to be lights-out.

When the signal S1, namely a voltage on the lighting indication reception terminal 105, becomes the low level, the voltage on the connecting point P2 becomes the low level through the resistor R1, so long as the output voltage on the switch section SW3 does not become the high level, the switch section SW1a is turned to the on-condition by the HLH control circuit 124, the CR filter 131, and the relay driving circuit 133, and the switch section SW2a is turned to the on-condition by the HLH control circuit 125, the CR filter 132, and the relay drive circuit 134. Consequently, the low-beam filaments 21 and 31 are lit.

In the case of the four-lamp system headlight, the voltage on the connecting point P2 is not forced to be the high level by removing the diode D1, even if the signal S2 becomes the low level. Accordingly, the left and right low-beam headlamps 91 and 92 are brought into lights-out when the signal S1 becomes the high level and are lighted regardless of the signal S2 when the signal S1 becomes the low level. The left and right high-beam headlamps 93 and 94 are brought into lights-out when the signal S2 becomes the high level and are lighted when the signal S2 becomes the low level.

Thus, the operations according to all lights-out, the low-beam lighting, and the high-beam lighting shown in FIG. 3 are carried out.

An operation of the headlamp control circuit 1b in the case where a failure occurs is described below. By referring to FIG. 4, if the CR filter is provided on either signal transmitting path extending from the switch section SW3 through the diode D1, the HLH control circuits 124, 125, the CR filters 131, 132, and the relay drive circuits 133, 134 to the switch section SW1a or SW2a, a signal chopped by the self protecting section 117 in the switch section SW3 is cut. Accordingly, if a load of the switch section SW3 is shorted under high-beam lighting, since the signal chopped by the self protecting section 117 in the switch section SW3 is cut by the CR filters 131 and 132, the voltage on the connecting point P2 is not forced to the high level and thus the low-beam filaments 21 and 31 are lighted and all headlamps are not light-out.

Since operations of the other failure modes are the same as those of the headlamp control circuit 1 shown in FIG. 2, their explanations are omitted.

As described above, according to the headlamp control circuit 1 shown in FIGS. 1 and 2 and the headlamp control circuit 1b shown in FIG. 7, it is possible to lower a possibility of lights-out in all headlamps in the event of the failure in the switch section SW 3 under the high-beam condition by carrying out the drive of lighting the right and left high-beam filaments 32 and 22 by a single switch section SW3 in the case of effecting the lighting control of the two-lamp system headlamp.

What is claimed is:

1. A headlamp control circuit comprising:
   first and second connecting terminals (101, 102) for outputting low-beam lighting voltages that light first and second luminescent parts (21, 31) to be used as low-beam headlamps, respectively;
   third and fourth connecting terminals (103, 104) for outputting high-beam lighting voltages that light third and fourth luminescent parts (22, 32) to be used as high-beam headlamps, respectively;
   first and second switch sections (SW1, SW2) for turning on and off supplies of said low-beam lighting voltages to said first and second connecting terminals (101, 102);
   a third switch section (SW3) for turning on and off together supplies of said high-beam lighting voltages to said third and fourth connecting terminals (103, 104);
   an output voltage detecting section (D1) for detecting an output voltage on said third switch section (SW3);
   an indication reception section (105, 106) for accepting a low-beam indication that lights said low-beam headlamps (21, 31) and a high-beam indication that lights said high-beam headlamps (22, 32); and
   a control section (120) for turning said third switch section (SW3) to an on-condition in the case where said indication reception section (105, 106) accepts said high-beam indication and for turning said first and second switch sections (SW1, SW2) to an on-condition in the case where said indication reception section accepts said low-beam indication and in the case where said indication reception section accepts said high-beam indication and said output voltage detecting section (D1) detects no high-beam lighting voltage.

2. The headlamp control circuit of claim 1, wherein said control section (120) comprises:
   a low-beam lighting signal output section (D2) for outputting a signal that turns said first and second switch sections (SW1, SW2) to an on-condition in the case where said indication reception section accepts either said low-beam lighting indication or said high-beam lighting indication;
   a high-beam lighting signal output section (123) for outputting a signal that turns said third switch section (SW3) to an on-condition in the case where said indication reception section (105, 106) accepts said high-beam lighting indication; and
   a forced-off section for compulsorily turning said first and second switch sections (SW1, SW2) to an off-condition in the case where said output voltage detecting section (D1) detects said high-beam lighting voltage.

3. The headlamp control circuit of claim 1, wherein said third switch section (SW3) is a semiconductor switch.

4. The headlamp control circuit of claim 1, wherein said third switch section (SW3) further includes a self protecting section (117) for chopping an output voltage when an abnormal condition is detected, and wherein a low-pass filter is provided in a signal transmitting path extending from said third switch section (SW3) through said output voltage detecting section (D1) and said control section (120) to said first and second switch sections (SW1, SW2), wherein said low-pass filter smoothes the chopped output voltage to turn said first and second switch sections to the on-condition.

5. The headlamp control circuit of claim 1, wherein said control section comprises:
   a DRL (Day-time Running Light) control circuit for outputting a control signal indicating a DRL mode; and
   a PWM (Pulse Width Modulation) generating circuit for generating a PWM signal of a predetermined duty ratio in response to the DRL mode control signal, wherein the PWM signal is applied to the first and second switch sections and the first and second switch sections are turned to the on-condition and the off-condition at the predetermined duty ratio.

6. The headlamp control circuit of claim 5, wherein the predetermined duty ratio is 80%.

7. The headlamp control circuit of claim 1, wherein said control section (120) comprises:
   a DRL (Day-time Running Light) control circuit for outputting a control signal indicating a DRL mode; and
   a PWM (Pulse Width Modulation) generating circuit for generating a PWM signal of a predetermined duty ratio in response to the DRL mode control signal, wherein the PWM signal is applied to the third switch section and the third switch section is turned to the on-condition and the off-condition at the predetermined duty ratio.

8. The headlamp control circuit of claim 7, wherein the predetermined duty ratio is 80%.

9. A headlamp control circuit comprising:
   first and second connecting terminals for outputting low-beam lighting voltages that light first and second luminescent parts (91, 92) to be used as low-beam headlamps, respectively;
   third and fourth connecting terminals for outputting high-beam lighting voltages that light third and fourth luminescent parts (93, 94) to be used as high-beam headlamps, respectively;
   first and second switch sections (SW1, SW2) for turning on and off supplies of said low-beam lighting voltages to said first and second connecting terminals;
   a third switch section (SW3) for turning on and off together supplies of said high-beam lighting voltages to said third and fourth connecting terminals;
   an indication reception section for accepting a low-beam indication that lights said low-beam headlamps and a high-beam indication that lights said high-beam headlamps; and
   a control section for turning said third switch section to an on-condition in the case where said indication reception section accepts said high-beam indication and for turning said first and second switch sections to an on-condition in the case where said indication reception section accepts said low-beam indication and in the case where said indication reception section accepts said high-beam indication.

10. The headlamp control circuit of claim 9, wherein said control section comprises:
    a DRL (Day-time Running Light) control circuit for outputting a control signal indicating a DRL mode; and
    a PWM (Pulse Width Modulation) generating circuit for generating a PWM signal of a predetermined duty ratio in response to the DRL mode control signal, wherein the PWM signal is applied to the third switch section and the third switch section is turned to the on-condition and the off-condition at the predetermined duty ratio.

11. The headlamp control circuit of claim 10, wherein the predetermined duty ratio is 80%.

* * * * *